United States Patent

Lu

[11] Patent Number: 6,003,718
[45] Date of Patent: Dec. 21, 1999

[54] THERMOS WITH TWO GLASS LINERS

[76] Inventor: Sheng-Nan Lu, No. 174, Chunying St., Shulin Chen, Taipei Hsien, Taiwan

[21] Appl. No.: 09/191,472

[22] Filed: Nov. 12, 1998

[51] Int. Cl.[6] .................................................. B65D 81/00
[52] U.S. Cl. ................................. 220/592.2; 220/592.27; 215/6
[58] Field of Search ........................... 220/592.2, 592.27, 220/23.88; 215/6

[56] References Cited

U.S. PATENT DOCUMENTS

| | | | |
|---|---|---|---|
| 3,337,073 | 8/1967 | Angelo | 215/6 |
| 3,465,905 | 9/1969 | Schottanes | 215/6 |
| 3,705,661 | 12/1972 | Davis | 215/6 |
| 3,744,622 | 7/1973 | Weaver | 215/6 X |
| 5,335,809 | 8/1994 | Toida et al. | 220/592.27 |
| 5,884,796 | 3/1999 | Hallmark | 220/592.27 X |

*Primary Examiner*—Steven Pollard
*Attorney, Agent, or Firm*—Kolisch Hartwell Dickinson McCormack & Heuser

[57] ABSTRACT

A thermos comprises an outer body including two glass liners therein for respectively maintaining liquids of different temperatures and an upper closure defining therein two openings each with an integral circular wall formed therearound for respectively receiving one of the glass liners. An O-shaped collar sealingly mounted around the circular wall of the opening has the external surface threaded, such that the collar is able to be threadingly connected with an inner cap. A silicon gasket is provided on the collar to further ensure the seal between the inner cap and the collar so as to retain the liquid temperature in the glass liners. All the components are detachable so that they can be cleaned separately.

2 Claims, 5 Drawing Sheets

THERMOS WITH TWO GLASS LINERS

BACKGROUND OF THE INVENTION

1. Field of the Invention

The present invention relates to a thermos and more particularly to a thermos with two glass liners therein for respectively preserving liquids at different temperatures so that the liquids can be combined to achieve liquids of intermediate temperatures.

2. Description of Related Art

As shown in FIG. 5, a conventional thermos comprises an outer body (60), a cap (70), and an inner glass liner (not shown) provided within the body (60). However, the thermos having only one glass liner therein can only maintain liquid at a single temperature. Thus it is difficult for people to make drinkable beverage with the liquid because the temperature might be too hot or cold.

To solve the problem, a thermos with two independent glass liners is introduced, such that a user is able to maintain different liquids at different temperatures for different purposes.

SUMMARY OF THE INVENTION

The main object of the present invention is to provide a thermos with two glass liners received therein to respectively maintain liquid of different temperatures, so as to facilitate a user to make beverages by mixing the liquid from the different glass liners together.

Another object of the present invention is to provide a thermos with two glass liners, wherein the space between the outer cap and the inner cap is a vacuum.

A further object of the present invention is to provide a thermos having all components detachable so that they can be cleaned separately.

DETAILED DESCRIPTION OF PREFERRED EMBODIMENT

Figure 1:
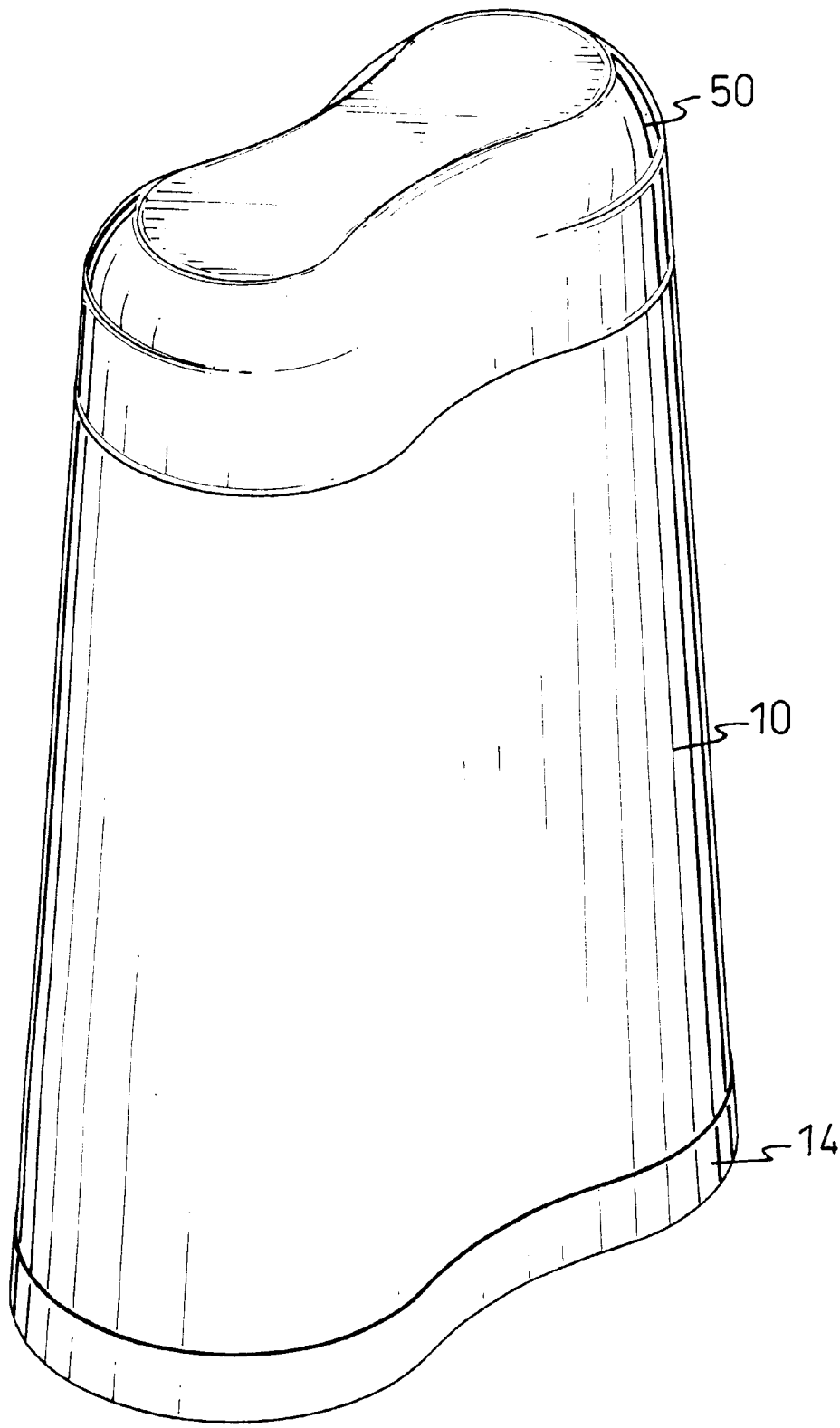
FIG. 1 is a perspective view of the present invention.
Figure 2:
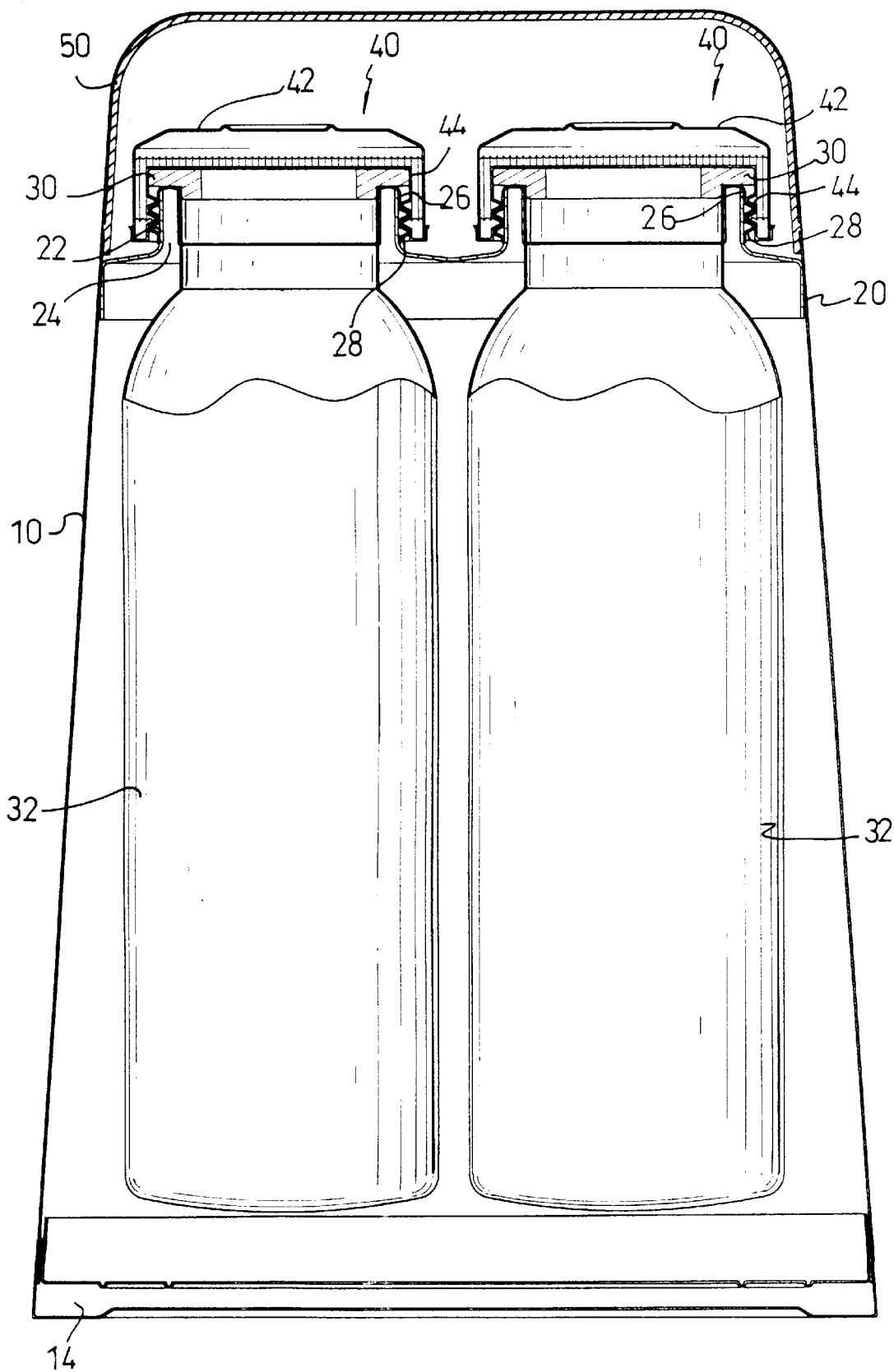
FIG. 2 is a partial cross sectional view of the present invention.
Figure 3:
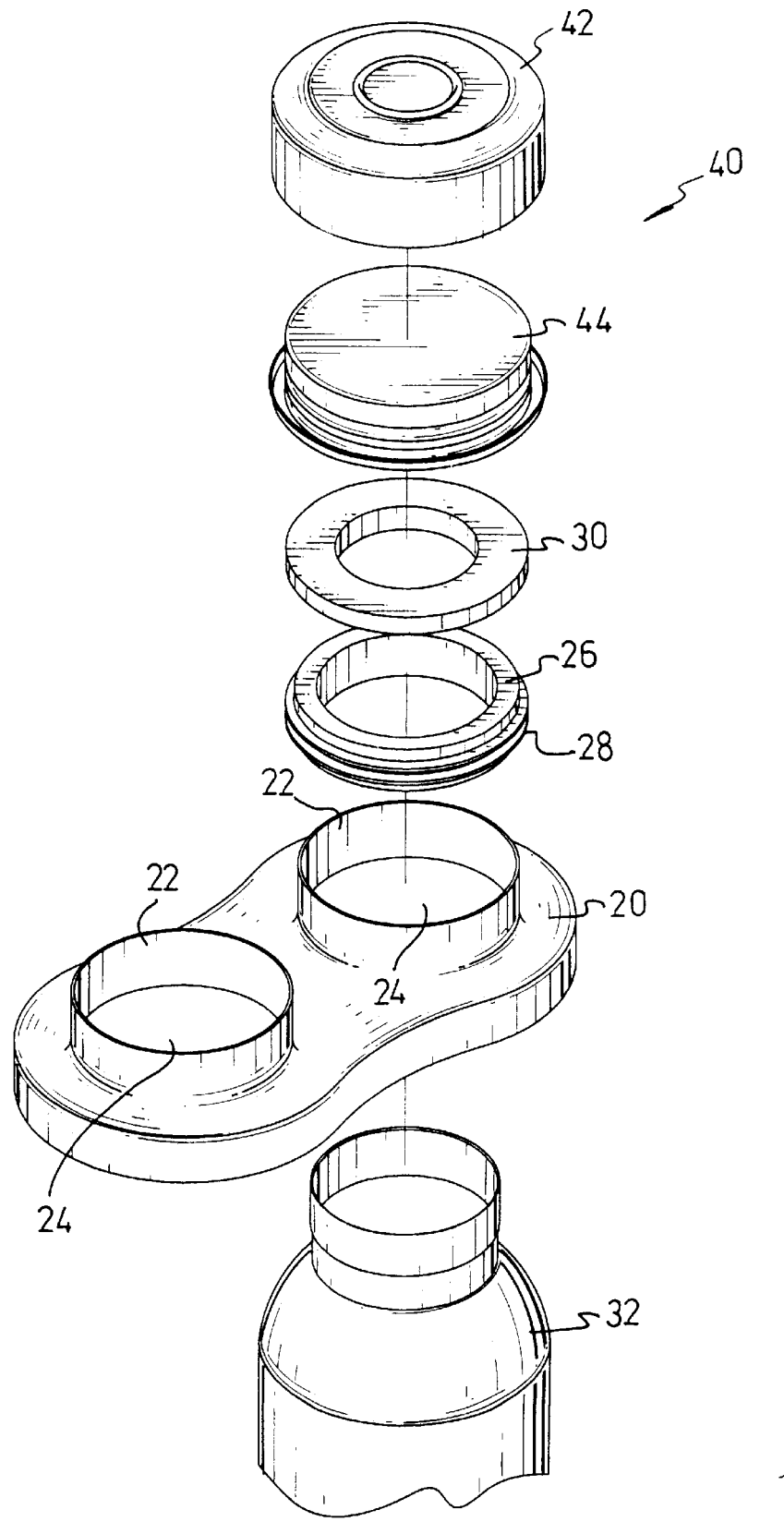
FIG. 3 is an exploded view showing components of the upper portion of the present invention.
Figure 4:
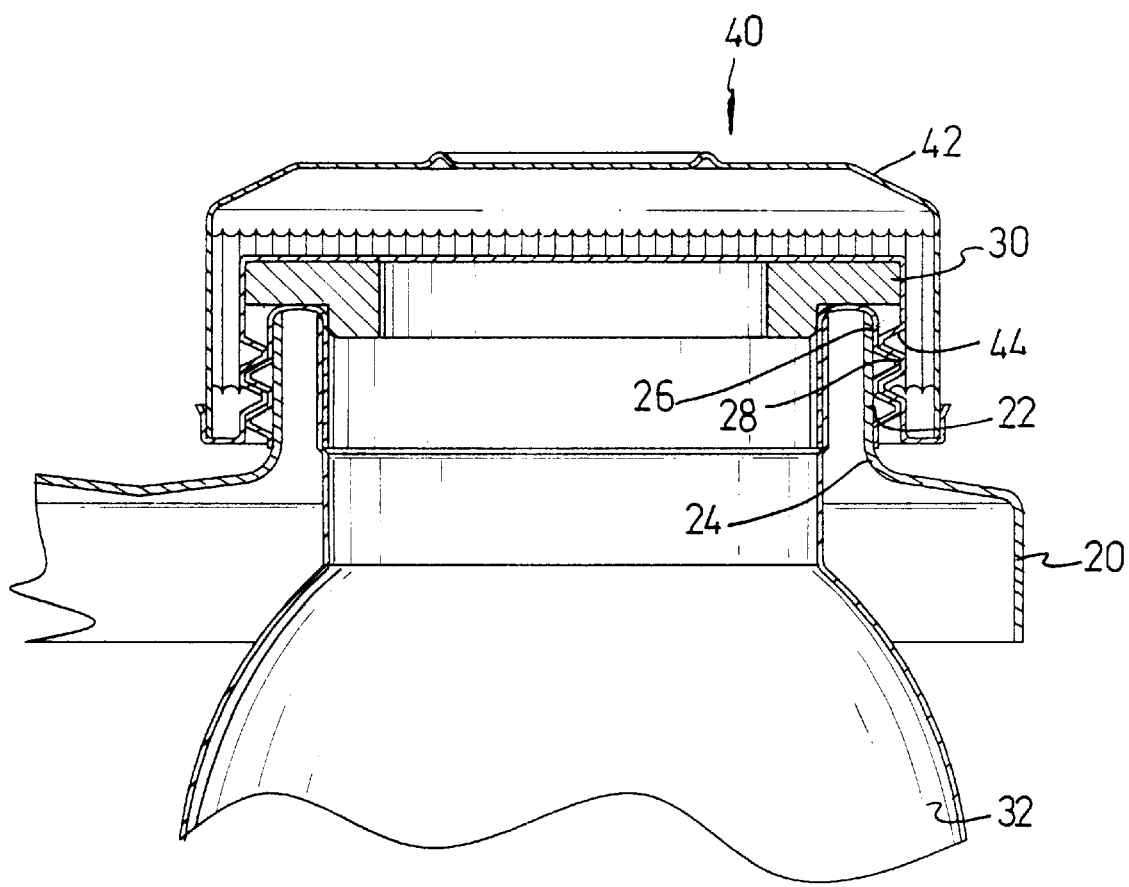
FIG. 4 is an enlarged partial sectional view of the present invention.
Figure 5:
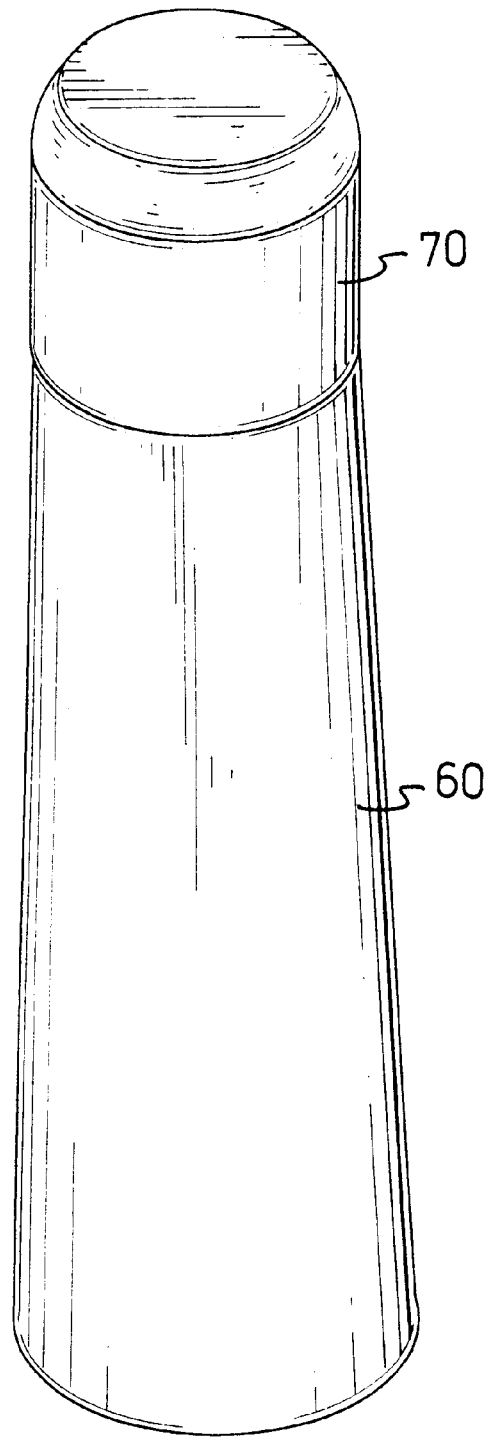
FIG. 5 is a perspective view of a conventional thermos.

As shown in FIGS. 1, 2, 3 and 4, the present invention comprises a tapered outer body (10) with two glass liners (32) arranged therein, a cap (50) detachably connected with the body (10) and a bottom plate (14) securely connected to the bottom of the body (10).

An upper enclosure (20) defines two openings (24) therein each with an integral circular wall (22) extending upward. An O-shaped collar (26) is mounted in a water tight manner around the circular wall (22) of the opening (24) and has a threaded external surface (28). A silicon gasket (30) is provided on the collar (26) to seal the glass liner (32) with the inner cap (40). The inner cap (40) includes an upper cap (42) and a lower cap (44) with a threaded sidewall. Thus, the inner cap (40) is able to be threadingly engaged with the threaded external surface (28) of the collar (26). After the upper cap (42) and the lower cap (44) are connected together, a space therebetween functions as an insulation to heat, such that the temperature of water received in the respective glass liner (32) is able to be maintained.

According to the description above, it is noted that all the components of the invention are detachably connected with each other, so that cleaning is accomplished when required.

The first advantage of the present invention is that the thermos enables users to preserve liquid of different temperatures in different glass liners (32), such that by mixing the liquids of different temperatures together, a user is able to make a drink with moderate temperature suitable for drinking. The second advantage of the present invention is to provide a vacuum preservation for the preserved water in the glass liners. Furthermore, the third advantage is that all the components of the thermos according to the present invention are detachable so that they can be cleaned separately.

What is claimed is:

1. A thermos with two glass liners having an outer body, a cap detachably connected with the outer body, a bottom plate securely connected to the bottom of the body; wherein the improvements comprising:

an upper closure defines two openings therein each, with an integral circular wall formed therearound for respectively receiving the glass liners therein;

a collar having a threaded outer surface is sealingly mounted around the circular wall of the opening; and an inner cap including an upper cap and a lower cap detachably connected with the upper cap and threadingly connected with the threaded outer surface of the collar.

2. A thermos as claimed in claim 1, wherein a silicon gasket is provided on the collar.

\* \* \* \* \*